United States Patent
Lindemann

[11] 3,906,021
[45] Sept. 16, 1975

[54] ALIPHATIC OXYCARBONYL THIOSULFATES

[75] Inventor: Martin K. O. Lindemann, Brookville, Md.

[73] Assignee: The Gillette Company, Boston, Mass.

[22] Filed: Mar. 29, 1974

[21] Appl. No.: 456,044

[52] U.S. Cl. .............................. 260/455 B; 424/301
[51] Int. Cl.² ........................................ C07C 154/00
[58] Field of Search ............................... 260/455 B

[56] References Cited
OTHER PUBLICATIONS
Chem. Abstract, Vol. 65, p. 12127, J. B. Caldwell.

*Primary Examiner*—Elbert L. Roberts
*Assistant Examiner*—D. R. Phillips

[57] ABSTRACT

A new class of chemical compounds having the formula

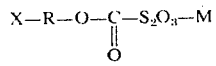

in which X is hydrogen or the grouping

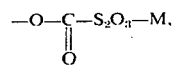

R is selected from the group consisting of (1) straight and branched open chain saturated and unsaturated aliphatic hydrocarbon radicals having from 1 to 18 carbon atoms in which the branching occurs at a carbon atom not directly bonded to the oxygen atom, (2) mono- and poly-oxaalykylene radicals having from one to five oxaalkylene groups in which each alkylene group contains from 2 to 10 carbon atoms and in which the total number of carbon and oxygen atoms is from 5 to 26, and (3) corresponding radicals in which at least one hydrogen atom is replaced by fluorine, and M is selected from the group consisting of alkali metals and alkali earth metals. These compounds act as acylating agents for amino and hydroxyl groups, for which purpose they can be used in aqueous solution. They are also effective as cross-linking agents for polymers containing amino or hydroxyl groups, as bacteriostatic and fungistatic agents and as antiperspirants.

13 Claims, No Drawings

ALIPHATIC OXYCARBONYL THIOSULFATES

This invention relates to a new class of chemical compounds and pertains more specifically to the certain aliphatic oxycarbonyl thiosulfates. They have been found to have unusual effectiveness and merit as cross-linking agents for polymers containing hydroxyl, amino, or thiol groups; as bacteriostats and fungistats; as ingredients of certain cosmetics, notably antiperspirants; as textile treating agents to impart durable special finishing effects such as hydrophobing; as acylating agents for organic amino and hydroxyl compounds; and for various other purposes.

Sodium benzoyl thiosulfate,

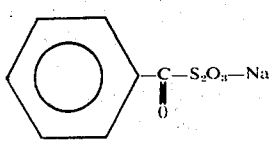

has been described in the scientific literature (A. Ito, Yukagaku Zasshi 82,866 (1962); also Japan Pat. No. 26,954 (1964); Chemical Abstracts 62, 10379 (1965)). It is water soluble and can be used as a benzoylating agent for amino, hydroxy and thiol groups in homogeneous aqueous solutions. Still more recently an aralkyl oxycarbonyl thiosulfate, the sodium salt of benzyloxycarbonyl thiosulfate

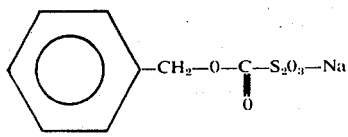

has been described by Caldwell, Ledger and Milligan (Australian J. Chem. 19, 1297-S (1966)). This was made by reacting benzyl chloroformate

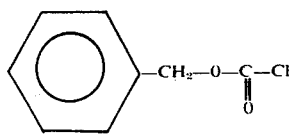

(which can also be called benzyloxycarbonyl chloride) with sodium thiosulfate. Caldwell et al. used this thiosulfate to selectively acylate the nitrogen of aminophenols and amino acids in aqueous solution. They also noted that it acted as an acylating agent for phenolic oxygens, but as an oxidizing agent for benzyl mercaptan.

I have now invented a group of alkyloxycarbonyl thiosulfates which possess a variety of useful and valuable properties, and which differ surprisingly and remarkably from the aralkyloxycarbonyl thiosulfate of the prior art.

These compounds may contain either one or two oxycarbonyl thiosulfate groups

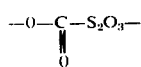

and have the following generic formula:

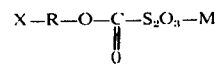

in which X is hydrogen or the grouping

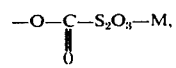

R is selected from the group consisting of (1) straight and branched open chain saturated and unsaturated aliphatic hydrocarbon radicals having from 1 to 18 carbon atoms in which the branching occurs at a carbon atom not directly bonded to the oxygen atom, (2) mono- and poly-oxaalkylene radicals having from one to five oxaalkylene groups in which each alkylene group contains from 2 to 10 carbon atoms and in which the total number of carbon and oxygen atoms is from 5 to 26, and (3) corresponding radicals in which at least one hydrogen atom is replaced by fluorine, and M is selected from the group consisting of alkali metals and alkaline earth metals.

One preferred class of compounds of the present invention includes those having the formula

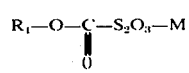

in which $R_1$ is a saturated or unsaturated straight or branched open chain hydrocarbon group having from 1 to 18 carbon atoms in which branching occurs at a carbon atom not directly bonded to the oxygen atom, and M is selected from the group consisting of alkali metals and alkaline earth metals.

Another preferred class of compounds includes those having the formula

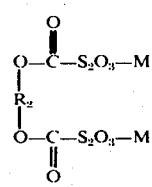

in which $R_2$ is a saturated or unsaturated straight or branched open chain hydrocarbon group having from 1 to 18 carbon atoms in which branching occurs at a carbon atom not directly bonded to oxygen, and M is selected from the group consisting of alkali metals and alkaline earth metals.

Still another preferred class of compounds includes those having the formula

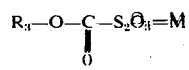

in which $R_3$ is a member of the group consisting of mono- and poly-oxaalkylene radicals containing from one to five oxaalkylene groups in which each alkylene group contains from 2 to 10 carbon atoms and in which the total number of carbon and oxygen atoms is from 5 to 26, and M is selected from the group consisting of alkali metals and alkaline earth metals.

Another preferred class of such compounds includes those having the formula

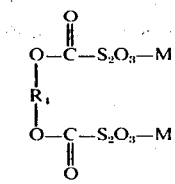

in which $R_4$ is a member of the group consisting of mono- and poly-oxaalkylene radicals containing from one to five oxaalkylene groups in which each alkylene group contains from 2 to 10 carbon atoms and in which the total number of carbon and oxygen atoms is from 5 to 26, and M is selected from the group consisting of alkali metals and alkaline earth metals.

The compounds in which M is sodium are generally preferred, although other compounds in which M is another alkali metal such as lithium or potassium or an alkali earth metal such as calcium, magnesium, barium or strontium are also of value. They may conveniently be prepared by reacting the appropriate alkyl chloroformates in solution with the appropriate metal thiosulfate. The preferred solvent for the reaction is a mixture comprising water and a water-soluble organic solvent (such as tetrahydrofuran, acetone, alcohol, or a glycol ether) which solvent by itself is capable of dissolving the appropriate chloroformate. The chloroformates are prepared by methods well known in the art, a convenient method being to react phosgene with the appropriate compound containing either one or two primary hydroxyl groups.

Among the hydroxyl compounds that can be used to prepare the chloroformates, which in turn can be converted by reaction with metal thiosulfate to the alkyloxycarbonyl thiosulfates, are the following: primary alcohols and diols having from one to two primary hydroxyl groups attached to a straight chain or branched chain aliphatic hydrocarbon group containing from one to eighteen carbon atoms and corresponding fluorinated alcohols and diols in which one or more of the hydrogen atoms in the hydrocarbon group is replaced by a fluorine atom; and mono- and poly-oxaalkylene glycols having two primary hydroxyl groups and one to five oxaalkylene groups, each alkylene group having from 2 to 10 carbon atoms, the total number of carbon and oxygen atoms in the chain connecting the two hydroxyl groups being from 5 to 26. The alcohols and diols which can be reacted with phosgene to provide chloroformates for use in making the compounds of the present invention include methanol, ethanol, 1-propanol, 2-methyl-2-propen-1-ol, 1-butanol, 2-buten-1-ol, 3-methyl-1-butanol, 1-hexanol, 2-ethyl-1-hexanol, 1-decanol, 1-dodecanol, 1-octadecanol, 7-fluoro-1-heptanol, 1H, 1H, 7H-dodecafluoro-1-heptanol, 1,2-ethanediol, 1,4-butanediol, 1,10-decandediol,1,18-octadecanediol, 2-ethoxyethanol, 2-(2-ethoxy-ethoxy) ethanol, diethylene glycol, tetraethylene glycol, and nonaethylene glycol.

Any of the foregoing primary alcohols and diols, when reacted with one or with two equimolar proportions of phosgene in a non-aqueous liquid diluent such as benzene, toluene or the like which does not react chemically with the hydroxyl compound or with the phosgene, form the corresponding mono- or bis-chloroformates. It is usually desirable to employ an excess of phosgene, up to 50% or more excess, to avoid formation of alkyl carbonate and to ensure complete reaction of the hydroxy compound. The reagents can simply be stirred together in the diluent at room temperature for several hours until the reaction is complete, whereupon the excess phosgene, by-product hydrogen chloride, and the diluent can be removed by evaporation, preferably at reduced pressure, to leave the mono- or bis-chloroformate in a high degree of purity. If desired, a hydrogen chloride acceptor such as pyridine can be employed in addition to or in place of a portion of the benzene or other diluent to react with the by-product hydrogen chloride, forming a solid pyridine hydrochloride which is insoluble and precipitates out of the diluent and can be separated by filtration before excess phosgene and diluent are evaporated.

The mono- or bis-chloroformate can be reacted with one or two equimolar proportions of the desired alkali metal or alkaline earth metal thiosulfate in solution in alcohol or aqueous alcohol; the amount of alcohol or aqueous alcohol is not critical. Preferably, the mono- or bis-chloroformate is dissolved in ethanol, and there is mixed with it at room temperature a water solution containing a molar quantity of thiosulfate equal to the molar quantity of mono-chloroformate or twice the molar quantity of bis-chloroformate, as the case may be. After several hours at room temperature, the alcohol is evaporated at reduced pressure, leading to precipitation of the carbonyl thiosulfate which can then be separated by filtration and recrystallized from ethanol if desired.

The following examples illustrate the preparation and use of compounds of the present invention.

EXAMPLE 1

Preparation of sodium n-hexyloxycarbonyl thiosulfate

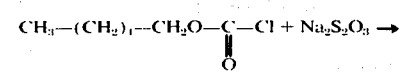

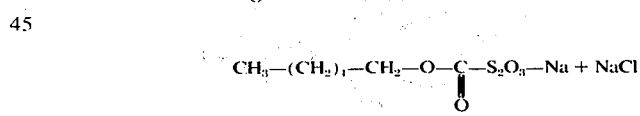

To 250 ml. of ethanol solution containing 32.96 g. (0.2 mole), n-hexyl chloroformate were added 250 ml. of an aqueous solution containing 49.65 g. (0.2 mole) of sodium thiosulfate pentahydrate and the mixture was stirred at room temperature for 3 hours. The progress of the reaction was monitored by iodimetric assay of the free thiosulfate in the reaction mixture. After standing overnight at 4°C. transparent platelike crystals had formed in the reaction mixture which were isolated by suction filtration giving a yield of 70.0% of the theoretical. After vacuum drying of the compound elemental analysis, bound thiosulfate assay and infrared spectrum were obtained verifying its identity.

EXAMPLE 2

Preparation of sodium n-octyloxycarbonyl thiosulfate 390.69 g. (3.0 moles) of redistilled n-octanol were mixed with 400 ml. anhydrous benzene. 355 g. (3.6 moles) phosgene dissolved in 3000 ml. benzene was added to this mixture and stirred overnight at room temperature.

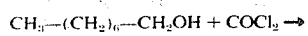

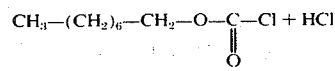

After removal of excess phosgene, hydrogen chloride and benzene by flash evaporation, the crude n-octyl chloroformate was dissolved in ethanol to make 2500 ml. solution. To it was added 1500 ml. of a water solution containing 744.54 g. (3.0 moles) of sodium thiosulfate pentahydrate; the reaction mixture was stirred at room temperature overnight. After removal of most of the ethanol by flash evaporation, the reaction mixture was cooled and the crystalline precipitate isolated (yield 50%). Following recrystallization from absolute ethanol, plate-like crystals were obtained.

EXAMPLE 3

Sodium 2-ethylhexyloxycarbonyl thiosulfate 57.8 g. (0.3 mole) of 2-ethylhexyl chloroformate were dissolved in cold ethanol to make 500 ml.; to it was added 500 ml. of an aqueous solution containing 74.5 g. (0.3 mole) of sodium thiosulfate pentahydrate. The reaction mixture was stirred at room temperature and the progress of the reaction monitored by iodimetric titration. After 18 hours the reaction was judged to be complete and two thirds of the reaction mixture removed by flash evaporation. After storing the residue at 4°C. overnight a white crystalline precipitate had separated which was isolated by suction filtration. The material was vacuum dried and identified as the desired compound by analysis.

EXAMPLE 4

Disodium dodecamethylene-1,12-bis(oxycarbonyl thiosulfate)

101.2 g. (0.5 mole) of 1,12-dodecanediol were dispersed in 1 liter of anhydrous benzene and 133.6 g. (1.35 moles) of phosgene dissolved in approximately 2 liters of cold, anhydrous benzene were combined with the dispersion in an Erlenmeyer flask. After stirring at room temperature for 18 hours unreacted phosgene, hydrogen chloride and benzene were removed by flash evaporation under reduced pressure. The dodecamethylene-1,12-dichloroformate obtained in high yield was dissolved in 500 ml. ice-cold ethanol and to it were added 158.11 g. sodium thiosulfate anhydrous (1.0 mole) dissolved in 500 ml. distilled water. The mixture was stirred for 20 hours at room temperature and sufficient solvent removed by flash evaporation under reduced pressure to initiate the separation of a white precipitate. The sample was kept at 4°C. overnight and the resulting solid filtered by suction filtration. The desired product was obtained in good yield by recrystallization from ethanol.

EXAMPLE 5

Disodium diethylene glycol bis(oxycarbonyl thiosulfate)

115.5 g. (0.5 mole) of diethylene glycol bis chloroformate

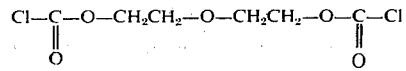

were dissolved in cold ethanol to make 600 ml. and combined with 600 ml. of a cold water solution containing 248.18 g. (1.0 mole) of sodium thiosulfate pentahydrate. The reaction was completed after 3 hours stirring at room temperature as indicated by iodimetric assay. The product was isolated by removal of the solvent and recrystallization from absolute ethanol.

EXAMPLE 6

Preparation of sodium 1H, 1H, 7H-dodecafluoroheptyloxycarbonyl thiosulfate

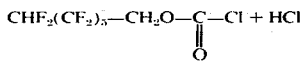

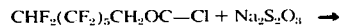

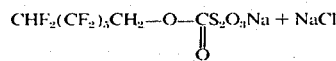

100 g. (0.3 mole) of 1H, 1H, 7H dodecafluoroheptyl alcohol, 200 g. phosgene and 52.6 g. (0.66 mole) of pyridine were dissolved in 1.2 liters of benzene at 5°–8°C. After stirring for 48 hours the solution was filtered to remove the pyridine hydrochloride precipitate and the benzene was removed by flash evaporation. The resulting chloroformate was dissolved in 400 ml. absolute ethanol and there were mixed with it 53.1 g. (0.33 mole) of anhydrous sodium thiosulfate dissolved in 400 ml. distilled water. The progress of the reaction was monitored by determining the disappearance of thiosulfate ion. After completion of the reaction the alcohol was removed from the solvent mixture by flash evaporation and the residue kept at 40°C. for 18 hours. The desired sodium 1H, 1H, 7H-dodecafluoroheptyloxycarbonyl thiosulfate precipitated and was isolated by suction filtration.

EXAMPLE 7

Preparation of potassium n-octyloxycarbonyl thiosulfate 64.0 g. (0.33 mole) of n-octylchloroformate were dissolved in 500 ml. ethanol and cooled to +5°C. 60 g. (0.33 mole) of potassium thiosulfate were dissolved in 500 ml. aqueous ethanol (50%) and the potassium thiosulfate solution added to the n-octylchloroformate with rapid stirring. After the reaction had progressed for four hours at room temperature, the ethanol was removed from the reaction mixture by evaporation at reduced pressure and the desired product, potassium n- octyloxycarbonyl thiosulfate, precipitated upon cooling. The crude product was recrystallized from absolute alcohol and identified by I.R. spectroscopy. Iodimetric assay indicated 96.7% purity.

EXAMPLE 8

Preparation of magnesium n-octyloxycarbonyl thiosulfate 57.8 g. (0.3 mole) of n-octylchloroformate were dissolved in 1000 cc. ethanol. 500 ml. of a solution containing 73.3 g. (0.3 mole), $MgS_2O_3$, $6H_2O$ in water were added with rapid stirring and the reaction mixture stirred at room temperature for 4 hours. After standing for 72 hours at 4°C., the solvent was evaporated under vacuum and the white crystalline product isolated.

The unusual and unexpected effectiveness as growth inhibitors of microorganisms of the oxycarbonyl thiosulfates of the present invention (as compared with the analogous benzyl oxycarbonyl thiosulfate) is illustrated in the following table, which shows the minimum inhibitory concentration (MIC) of various members of the series toward three different microorganisms

| oxycarbonyl thiosulfate Na salt | MIC% Organism | | |
|---|---|---|---|
| | S. aureus | C. albacans | T. rubrum |
| n-hexyl | .1 | .3 | .03 |
| n-octyl | .1 | .1 | .03 |
| n-decyl | .2 | .1 | .03 |
| n-hexadecyl | .01 | .1 | .003 |
| benzyl | .2 | >.5 | .2 |

Descriptions of the test organisms are as follows:

*Staphlococcus aureus* (ATCC-6538): gram-positive spherical cells occurring in irregular clusters; pathogenic for man; isolated from skin surfaces; infections range from mild localized pustules to food poisoning.

*Candida albicans* (ATCC-2091): an oval, budding, yeast-like fungus; frequently found in the normal mouth and intestinal tract; may cause infections of intertriginous areas of the skin, infections of the nails, and occasional systemic infections.

*Trichophyton rubrum* (NIH-705): a dermatophytic fungus; causes specific infections of superficial keratinized areas of man such as skin, hair, and nails; rarely invades subcutaneous tissue; causative agent of many tinea infections.

The oxycarbonyl thiosulfates of this invention are notably more resistant to hydrolysis than the corresponding benzyl compound. They are sufficiently stable in aqueous solution to act as acylating agents for amino and hydroxyl groups in polymeric substances that are swellable and permeable but not soluble in water, notably the naturally occurring and synthetic carbohydrate and proteinaceous polymers. They are of special value in appyling various finishing treatments to cellulosic and proteinaceous fibers. As an example a durable hydrophobic finish can be imparted to bleached cotton or viscose rayon by simply heating these fibers in a dilute aqueous solution of sodium octadecyloxycarbonyl thiosulfate at a pH between 8 and 9.5. Similarly, the protein chains that constitute reduced wool and hair can be cross-linked by warming these fibers in a dilute aqueous solution of octamethylene-1,8-bisoxycarbonyl thiosulfate di-sodium salt at a pH between 8 and 9.5. By virtue of this cross-linking treatment the water-swellability of the fibers as well as their plasticity is decreased to or beyond the level characteristic of the virgin unreduced fibers. Synthetic proteinaceous fibers such as those spun from zein or peanut protein or soybean protein can be cross-linked, to increase their strength and decrease their swellability, by treating with aqueous solutions of the alkylene-alpha, omega-bis-oxycarbonyl thiosulfates.

Another outstanding and unexpected property of the oxycarbonyl thiosulfates of this invention is their ability, when applied topically to the skin, to inhibit perspiration. The antiperspirant activity of the sodium straight chain monoalkyloxycarbonyl thiosulfates varies with the chain length. The following table shows the results of an antiperspirant screening test on rats feet, according to the procedure of Quatrale and Laden, J. Investigative Dermatology 51, No. 6 502 (1968). In all cases the pH was 9, the concentration of test antiperspirant 2%, the soaking time 60 mins. The numbers show mg. sweat produced in 20 minutes after treatment with various oxycarbonyl thiosulfates.

| oxycarbonyl thiosulfate Na salt | mg. sweat ± standard error |
|---|---|
| none (water control) | 6.2 ± .4 |
| n-heptyl | 2.4 ± .5 |
| n-octyl | .9 ± .2 |
| n-decyl | 1.2 ± .2 |
| n-dodecyl | 3.3 ± .2 |
| dodecyl-alpha, omega-bis | 3.6 ± .4 |
| benzyl | 6.4 ± .6 |

What is claimed is:
1. A compound having the formula

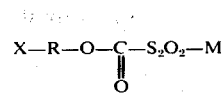

in which
X is selected from the group consisting of hydrogen and the grouping

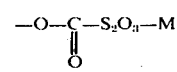

R is selected from the group consisting of (1) straight and branched open chain saturated and unsaturated aliphatic hydrocarbon radicals having from 1 to 18 carbon atoms in which the branching occurs at a carbon atom not bonded directly to oxygen when X is hydrogen, (2) straight and branched open chain saturated and unsaturated aliphatic hydrocarbon radicals having from 2 to 18 carbon atoms in which the branching occurs at a carbon atom not bonded directly to oxygen when X is

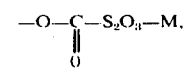

(3) mono- and poly-oxaalkylene radicals having from one to five oxaalkylene groups in which each alkylene group contains from 2 to 10 carbon atoms and in which the total number of carbon and oxygen atoms is from 5 to 26, and (4) corresponding radicals in which at least one hydrogen atom is replaced by fluorine, and M is selected from the group consisting of alkali metals and alkali earth metals.

2. A compound having the formula

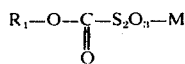

in which $R_1$ is a saturated or unsaturated straight or branched open chain hydrocarbon group having from 1 to 18 carbon atoms in which branching occurs at a carbon atom not bonded directly to oxygen, and M is selected from the group consisting of alkali metals and alkaline earth metals.

3. A compound as claimed in claim 2 in which M is sodium.

4. A compound having the formula

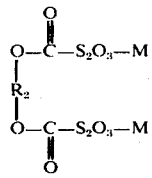

in which $R_2$ is a saturated or unsaturated straight or branched open chain hydrocarbon group having from 2 to 18 carbon atoms in which branching occurs at a carbon atom not bonded directly to oxygen and M is selected from the group consisting of alkali metals and alkaline earth metals.

5. A compound as claimed in claim 4 in which M is sodium.

6. A compound having the formula

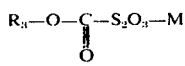

in which $R_3$ is a member of the group consisting of mono- and poly-oxyaalkylene radicals containing from one to five oxaalkylene groups in which each alkylene group contains from 2 to 10 carbon atoms and in which the total number of carbon and oxygen atoms is from 5 to 26 and M is selected from the group consisting of alkali metals and alkaline earth metals.

7. A compound as claimed in claim 6 in which M is sodium.

8. A compound having the formula

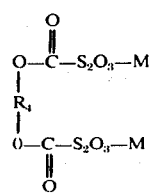

in which $R_4$ is a member of the group consisting of mono- and poly-oxaalkylene radicals containing from one to five oxaalkylene groups in which each alkylene group contains from 2 to 10 carbon atoms and in which the total number of carbon and oxygen atoms is from 5 to 26 and M is selected from the group consisting of alkali metals and alkaline earth metals.

9. Sodium n-hexyloxycarbonyl thiosulfate.

10. Sodium n-octyloxycarbonyl thiosulfate.

11. Disodium dodecamethylene-1,12-bis(oxycarbonyl thiosulfate).

12. Disodium diethylene glycol bis(oxycarbonyl thiosulfate).

13. Sodium 1H, 1H, 7H-dodecafluoroheptyloxycarbonyl thiosulfate.

* * * * *

UNITED STATES PATENT AND TRADEMARK OFFICE
CERTIFICATE OF CORRECTION

PATENT NO. : 3,906,021
DATED : September 16, 1975
INVENTOR(S) : Martin K. O. Lindemann It is certified that error appears in the above-identified patent and that said Letters Patent are hereby corrected as shown below:

Column 3, line 61, "decandediol" is misspelled and should be --decanediol--;

Column 8, claim 1, in the formula, "$S_2O_2$" should be --$S_2O_3$--.

Signed and Sealed this twentieth Day of April 1976

[SEAL]

Attest:

RUTH C. MASON
Attesting Officer

C. MARSHALL DANN
Commissioner of Patents and Trademarks